(12) United States Patent
Sirdey et al.

(10) Patent No.: US 12,184,754 B2
(45) Date of Patent: Dec. 31, 2024

(54) LOW LATENCY CALCULATION TRANSCRYPTION METHOD

(71) Applicant: COMMISSARIAT A L'ENERGIE ATOMIQUE ET AUX ENERGIES ALTERNATIVES, Paris (FR)

(72) Inventors: Renaud Sirdey, Cernay-la-Ville (FR); Sergiu Carpov, Massy (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 457 days.

(21) Appl. No.: 17/282,601

(22) PCT Filed: Oct. 3, 2019

(86) PCT No.: PCT/FR2019/052353
§ 371 (c)(1),
(2) Date: Apr. 2, 2021

(87) PCT Pub. No.: WO2020/070455
PCT Pub. Date: Apr. 9, 2020

(65) Prior Publication Data
US 2021/0391976 A1    Dec. 16, 2021

(30) Foreign Application Priority Data

Oct. 5, 2018  (FR) ...................................... 1859251

(51) Int. Cl.
*H04L 9/00* (2022.01)
*G06F 12/123* (2016.01)
(Continued)

(52) U.S. Cl.
CPC ............ *H04L 9/008* (2013.01); *G06F 12/123* (2013.01); *H04L 9/065* (2013.01); *H04L 9/0825* (2013.01)

(58) Field of Classification Search
CPC ....... H04L 9/008; H04L 9/065; H04L 9/0825; G06F 12/123
See application file for complete search history.

(56) References Cited

U.S. PATENT DOCUMENTS 7,284,014 B2 * 10/2007  Idei ..................... G06F 16/2453
                                                    707/769
10,491,373 B2 * 11/2019  Jain ......................... H04L 9/008
(Continued)

FOREIGN PATENT DOCUMENTS

CN            107045480 A    *   8/2017

OTHER PUBLICATIONS

Practical Personalized Genomics in the Encrypted Domain Kalpana Singh* , Renaud Sirdey† , Sergiu Carpov† (Year: 2018).*
Practical Privacy-Preserving Medical Diagnosis using Homomorphic Encryption Sergiu Carpov, Thanh Hai Nguyen, Renaud Sirdey CEA, LIST (Year: 2016).*
Private federated learning on vertically partitioned data via entity resolution and additively homomorphic encryption Stephen J. Hardy Wilko Henecka Hamish Ivey-Law Richard Nock Université des Antilles (Year: 2017).*

(Continued)

*Primary Examiner* — Shin-Hon (Eric) Chen
*Assistant Examiner* — Thomas A Carnes
(74) *Attorney, Agent, or Firm* — Oblon, McClelland, Maier & Neustadt, L.L.P.

(57) ABSTRACT

A method for confidentially processing data stored on a platform is described. A transcryption module, receiving a request for access to a data block, transmits the access request to an access request prediction module which returns a list of data blocks. The transcryption module determines whether a corresponding key stream block is present in the cache. The homomorphic calculation module calculates homomorphic ciphertexts of key stream blocks corresponding to the data blocks of the list. The transcryption module transcrypts the data blocks by adding them with the homomorphic ciphertexts of the corresponding key stream blocks.

(Continued)

US 12,184,754 B2
Page 2

The transcryption module transmits the data blocks thus transcrypted to the request management module.

10 Claims, 3 Drawing Sheets

(51) Int. Cl.
*H04L 9/06* (2006.01)
*H04L 9/08* (2006.01)

(56) References Cited

U.S. PATENT DOCUMENTS

| | | | |
|---|---|---|---|
| 10,929,402 B1* | 2/2021 | Meng | H04L 9/0816 |
| 11,374,742 B2* | 6/2022 | Yasuda | H04L 9/0861 |
| 2015/0270964 A1* | 9/2015 | Yasuda | H04L 9/14 713/171 |
| 2016/0070887 A1* | 3/2016 | Wu | G06F 21/74 713/189 |
| 2016/0204936 A1* | 7/2016 | Sakemi | G06F 21/6227 380/28 |
| 2016/0259728 A1* | 9/2016 | Eddy | G06F 12/128 |
| 2017/0155628 A1* | 6/2017 | Rohloff | H04L 63/02 |
| 2017/0331802 A1* | 11/2017 | Keshava | H04L 9/0894 |
| 2018/0034789 A1* | 2/2018 | Gaydos | H04L 63/0281 |
| 2019/0087352 A1* | 3/2019 | Lee | G06F 12/0246 |
| 2019/0334708 A1* | 10/2019 | Carpov | H04L 9/3093 |
| 2020/0151356 A1* | 5/2020 | Rohloff | G06F 21/6245 |
| 2021/0367786 A1* | 11/2021 | Sheets | H04W 12/02 |
| 2021/0391976 A1* | 12/2021 | Sirdey | H04L 9/008 |

OTHER PUBLICATIONS

International Search Report issued on Jan. 29, 2020 in PCT/FR2019/052353 filed on Oct. 3, 2019, 3 pages.
Preliminary French Search Report issued on Jun. 14, 2019 in French Application No. 18 59251 filed on Oct. 5, 2018 (with translation of category of cited documents), 2 pages.
Carpov et al., "Practical Privacy-Preserving Medical Diagnosis using Homomorphic Encryption", 2016 IEEE $9^{th}$ International Conference on Cloud Computing, IEEE, Jun. 27, 2016, pp. 593-599, XP033047954.
Singh et al., "Practical Personalized Genomics in the Encrypted Domain", 2018 Third International Conference on Fog and Mobile Edge Computing (FMEC), IEEE, Apr. 23, 2018, pp. 139-146, XP033351568.
Canteaut et al., "Stream Ciphers: A Practical Solution for Efficient Homomorphic-Ciphertext Compression", CryptoAction Symposium 2016, Apr. 2016, Budapest, Hungary, hal-01401328, pp. 1-21 (23 total pages).

* cited by examiner

LOW LATENCY CALCULATION TRANSCRYPTION METHOD

TECHNICAL FIELD

The present invention generally relates to the field of homomorphic encryption and more particularly to that of transcryption of data previously encrypted by means of a symmetric cryptosystem.

STATE OF PRIOR ART

Homomorphic encryption allows operations (in practice addition or multiplication arithmetic operations) to be performed on data without ever revealing them.

Homomorphic encryption is a (as a general rule asymmetric) encryption $Enc_{pk}$ (of public key pk) verifying the following property:

$$Enc_{pk}:\Omega \to \Gamma$$

$$Dec_{sk}[Enc_{pk}(a) \oplus Enc_{pk}(b)] = a+b \quad (1)$$

Where $\Omega$ is the plaintext message space (more simply called the plaintext space) and $\Gamma$ is the encrypted or ciphered message space (more simply called the ciphertext space), + an additive operation in the plaintext space giving $\Omega$ a group structure, $\oplus$ an operation in the encrypted space giving $\Gamma$ a group structure. It is thus understood that the application of $(\Omega,+)$ in $(\Gamma,\oplus)$ is a group homomorphism. $Dec_{sk}$ is the decryption function corresponding to $Enc_{pk}$ (where sk is the user's secret key).

It results from expression (1) that it is possible to perform an additive operation between two plaintext messages (a,b) from a corresponding operation between their corresponding ciphertexts ($Enc_{pk}(a)$, $Enc_{pk}(b)$).

More generally, homomorphic encryption can be considered as a ring morphism between the plaintext space (with the operations +,×) and the ciphertext space (with the corresponding operations $\oplus,\otimes$). The following properties are then obtained:

$$Dec_{sk}(Enc_{pk}(a+b)) = Dec_{sk}(Enc_{pk}(a) \oplus Enc_{pk}(b)) = a+b \quad (2\text{-}1)$$

$$Dec_{sk}(Enc_{pk}(a \times b)) = Dec_{sk}(Enc_{pk}(a) \otimes Enc_{pk}(b)) = a \times b \quad (2\text{-}2)$$

The previous definitions have been given in the case of additive and multiplicative operations, but it is understood that any pair of operations giving the ciphertext space a ring structure can be contemplated.

Using expressions (2-1) and (2-2), it is possible to evaluate any function $f$, resolvable into elementary addition and multiplication operations, in the ciphertext space and then to decipher the result.

In the remainder of the description, the notations Enc(HE.pk,a) and Dec(HE.sk,x) will be used instead of $Enc_{pk}(a)$ and $Dec_{sk}(x)$ to respectively refer to a homomorphic encryption operation (of a) with the public key HE.pk and a homomorphic decryption operation (of x) using the private key HE.sk.

Homomorphic encryption, for example, allows a client to delegate processing of its data to a remote server, without the latter having access to the data. To do this, the client generates a private key from a homomorphic cryptosystem and encrypts the data to be processed by means of the corresponding public key. The encrypted data are transmitted to the server that performs the processing in question in the homomorphic domain and returns the result, still encrypted in the homomorphic domain, to the client. The client can then retrieve the processing result in plaintext, after decrypting it with the private key of the cryptosystem.

However, this method for confidentially processing data has a major drawback, that of the size of the homomorphically encrypted data. In the best case, it takes about 2 kbytes of homomorphically encrypted data for 1 bit of plaintext data. In order to overcome this increase in encrypted data, a transcryption technique can be resorted to.

Generally speaking, transcryption makes it possible to switch from data encrypted by a first cryptosystem to the same data encrypted by a second cryptosystem, without passing through an intermediate decryption step in the plaintext space.

In the following, it will be assumed that the first cryptosystem is that of a stream encryption and that the second system is that of a homomorphic encryption.

Stream encryption is symmetric encryption in which the message to be encrypted is simply added bit-by-bit with a key stream, noted as Kstr, generated from a symmetric key, ksym. Decryption is performed as encryption, by simple bit-by-bit addition of the piece of data encrypted with the key stream.

Thus, if a plaintext piece of data is noted as a, the piece of data encrypted by the symmetric encryption S as S(krym,a), (that is, by addition with the key stream Kstr in the case of stream encryption), the decryption operation (identical to S in the case of stream encryption) as $S^{-1}$ and this same decryption operation in the homomorphic domain as $S_{HE}^{-1}$:

$$S_{HE}^{-1}(Enc(HE.pk,ksym),Enc(HE.pk,S(ksym,a))) = Enc(HE.pk,a) \quad (3)$$

In other words, it is possible to decrypt, in the homomorphic domain, a piece of data encrypted a first time by symmetric encryption, S(ksym,a), and a second time by homomorphic encryption.

Stream decryption is simply performed in the homomorphic domain (that is, in the homomorphic ciphertext domain), by means of the homomorphic ciphertext of the key stream and the elementary operation $\oplus$:

$$S_{HE}^{-1}(Enc(HE.pk,ksym),Enc(HE.pk,S(ksym,a))) = Enc(HE.pk,Kstr) \oplus Enc(HE.pk,S(ksym,a)) \quad (4)$$

The key stream, Kstr, is generally obtained from a set of feedback shift registers some inputs and/or outputs of which are combined non-linearly. These shift registers are initialised by initial values obtained from the symmetric key, ksym, and an initialisation vector, IV. While the symmetric key remains identical from one encryption operation to another, the initialisation vector (counter output for example) can be periodically incremented. Stream encryption algorithms such as Trivium, Kreyvium, or those of the FLIP family use this initialisation principle.

Homomorphic ciphertext of the key stream Enc(HE.pk, Kstr) is generated in the homomorphic domain from Enc(HE.pk,ksym), also called a transcryption (public) token. In other words, just as one is able to generate a key stream from the symmetric key, ksym, in the plaintext space, one is able to generate a homomorphic ciphertext of the key stream from the transcryption token Enc(HE.pk,ksym), in the homomorphic space, as described for example in the paper (cf. in particular § 2.2) of A. Canteau et al. entitled "Streamciphers: a practical solution for efficient homomorphic-ciphertext compression" published in FSE 2016: 23rd International Conference on Fast Software Encryption, Springer Verlag, 20-23 Mar. 2016, Bochum, Germany, 2016, vol. 9783—LNCS (Lecture Notes in Computer Science), pp. 313-333.

It is seen in expression (4) that the first term on the right, Enc(HE.pk,Kstr), in other words, the homomorphic ciphertext of the key stream, can be calculated offline, once and for all as long as the initialisation conditions (vector IV) remain unchanged.

The situation of a client making use of a remote platform to perform data processing in a confidential manner has been illustrated in FIG. 1.

In step 110, the client, CLT, generates a private key-public key pair of a homomorphic (asymmetric) cryptosystem, that is HE.sk, HE.pk and sends the public key HE.pk to the remote platform, PTF. Besides, the client generates in 120 a stream encryption symmetric key, ksym, and then, in 130, the transcryption token, Enc(HE.pk,ksym), corresponding to this key and to an initialisation vector IV. As long as the initialisation vector is not modified, the transcryption token can be used to process requests of the client in question.

In step 140, the client encrypts the data to be processed, a, by means of symmetric encryption, that is S(kvym,a) and sends a processing request, PR, to the platform, having S(ksym,a) as an argument.

In step 150, the platform performs homomorphic encryption of the encrypted data S(ksym,a) by means of the public key, HE.pk.

In step 160, the platform performs transcryption of the data to be processed a, according to expression (4). The transcryption result is none other than Enc(HE.pk,a).

In step 170, the platform performs data processing, F, in the homomorphic domain, that is $F_{HE}$. The result is obtained in encrypted form in the homomorphic domain, Enc(FHE.pk,r)=$F_{HE}$(Enc(FHE.pk,a)).

In step 180, the platform returns the result in encrypted form to the client which decrypts it in 190 by means of the private key, FHE.sk, to obtain the result in plaintext, r=F(a).

It will be first noted that the client can directly generate the homomorphic ciphertext of the key stream, Enc(HE.pk, Kstr), in 130, and transmit it to the platform.

It will additionally be noted that step 150 can also be performed by the client, in which case the processing request has the argument Enc(HE.pk,S(ksym,a)). The transcryption step, 160, can then be performed very quickly, on the fly, by means of a simple bit-by-bit addition (XOR operation) in the homomorphic domain, that is Enc(HE.pk,Kstr)⊕Enc(HE.pk,S(ksym,a)). It is understood that the transcryption step induces almost no latency.

The situation is different, however, when a client wishes to perform confidential processing on data stored on the platform and no longer transmitted with a request. This situation, illustrated in FIG. 2, involves a client (or data user), CLT, a platform in charge of executing the requests, PTF, and a data provider, DP.

As for the client, it generates as previously in 210 a private key-public key pair of a homomorphic cryptosystem HE.sk, HE.pk. The public key HE.pk is transmitted to the platform and to the data provider in 215.

The data provider generates in 220 a symmetric key ksym of a symmetric cryptosystem as well as the corresponding transcryption token, Enc(HE.pk,ksym). The transcryption token is transmitted to the platform in 225.

Besides, data, a, from the data provider are encrypted by means of the symmetric key ksym, in other words these data are summed bit-by-bit to the key stream, Kstr, in 230, before being transmitted to the platform.

The encrypted data, S(ksym,a) are homomorphically encrypted a second time by the platform in step 240, to obtain Enc(HE.pk,S(ksym,a)).

Besides, in 245, the homomorphic ciphertext of the key stream, that is Enc(HE.pk,Kstr), is generated by the platform from the transcryption token Enc(HE.pk,ksym).

In step 250, the encrypted data are transcrypted by means of the expression (4). The result consists of these same data, encrypted in the homomorphic domain, namely Enc(HE.pk, a).

Thus, when the client requests in 260, by means of a request, PR($i_a$), that processing be performed on data from the data provider, the platform searches for the corresponding data available in the homomorphic domain, Enc(HE.pk, a), and performs in 270 the requested processing $F_{HE}$. The result is obtained in the homomorphic domain Enc(HE.pk,r) with r=F(a).

The result is then transmitted in 280 to the client which decrypts it in 290 by means of the private key HE.sk to obtain the result in plaintext, r=F(a).

In this context of use, data provided by the access provider are stored on the platform in encrypted form in the homomorphic domain. However, given the strong increase in the size of data during their encryption in the homomorphic domain, this solution is not acceptable for large size databases, such as a genomic database for example.

One solution would be to request from the data provider to perform homomorphic encryption on an ad-hoc basis. However, such a solution would be detrimental in terms of latency for processing the request.

The purpose of the present invention is therefore to provide a method for confidentially processing data stored on a remote platform that does not have significant calculational latency. More precisely, the purpose of the present invention is to provide a transcryption method that induces only a very low latency time during such processing.

DISCLOSURE OF THE INVENTION

The present invention is defined by a method for confidentially processing data stored on a platform, the data being stored in a database, in a form encrypted by stream encryption, using a key stream generated from a symmetric key, the confidential processing being carried out upon request from a client having previously generated a private key-public key pair of a homomorphic cryptosystem and having transmitted said public key to the platform, the processing method comprising the following steps:

a request management module, (RQM) receiving a request from the client (PR($i_a$)), generates a plurality of requests for access ($arq_1$, ..., $arq_N$) to data blocks ($B_1$, ..., $B_N$) and transmits these requests to a transcryption module (TCA);

the transcryption module, (TCA) receiving a request for access ($arq_n$) to a data block, transmits the access request to an access request prediction module (AP) which returns thereto a list ($\Omega_n$) of data blocks the access to which is predicted;

the transcryption (TCA) module reads the data block ($B_n$) from the database and determines whether a corresponding key stream block is present in the cache, and if not, adds it to the list of data blocks, the list of data blocks being provided to a homomorphic calculation module (KSHC);

the homomorphic calculation module (KSHC) is adapted to calculate, in the homomorphic domain, homomorphic ciphertexts of key stream blocks corresponding to the data blocks of said list, and to transmit the homomorphic ciphertexts of the key stream blocks to the transcryption module as they are obtained;

the transcryption module (TCA) stores the homomorphically ciphertexts of the key stream blocks in the cache, and transcrypts the data blocks the access to which is requested by adding them respectively with the homomorphic ciphertexts of the corresponding key stream blocks, read from the cache;

the transcryption module (TCA) transmits the data blocks thus transcrypted to the request management module (RQM) which performs, in the homomorphic domain, processing on the data blocks thus transcrypted corresponding to the request;

the request management module (RQM) transmits to the client the processing result, in homomorphically encrypted form.

According to an example of embodiment, the request management, transcryption, access request prediction and homomorphic calculation modules are software agents.

According to a first type of implementation, the request management, transcryption, access request prediction and homomorphic calculation modules are installed on a same machine.

According to a second type of implementation, the request management, transcryption, access request prediction modules are located on a first machine and the homomorphic calculation module is installed on a second machine. In this case, the second machine can be equipped with a homomorphic encryption hardware accelerator.

In particular, the second machine can be a server, the first machine asynchronously transmitting, to the server, requests for homomorphic ciphertext of key stream blocks for transcryption operations to be performed or for predicted transcryption operations.

The platform can host a plurality of databases, each database being fed by a data provider and being associated with a symmetric encryption key, the data blocks stored in a database being encrypted by the data provider feeding the database, by means of a key stream generated from the symmetric key associated with this database.

The cache can be managed by a FIFO type replacement algorithm. Alternatively, it can be managed by an LRU or MRU replacement algorithm.

Advantageously, the platform comprises a plurality of access prediction modules, each access prediction module being adapted to predict requests for access to a database associated with this module.

BRIEF DESCRIPTION OF THE DRAWINGS

Further characteristics and advantages of the invention will appear upon reading a preferential embodiment of the invention, described with reference to the appended figures in which.

DETAILED DISCLOSURE OF PARTICULAR EMBODIMENTS

Figure 1:
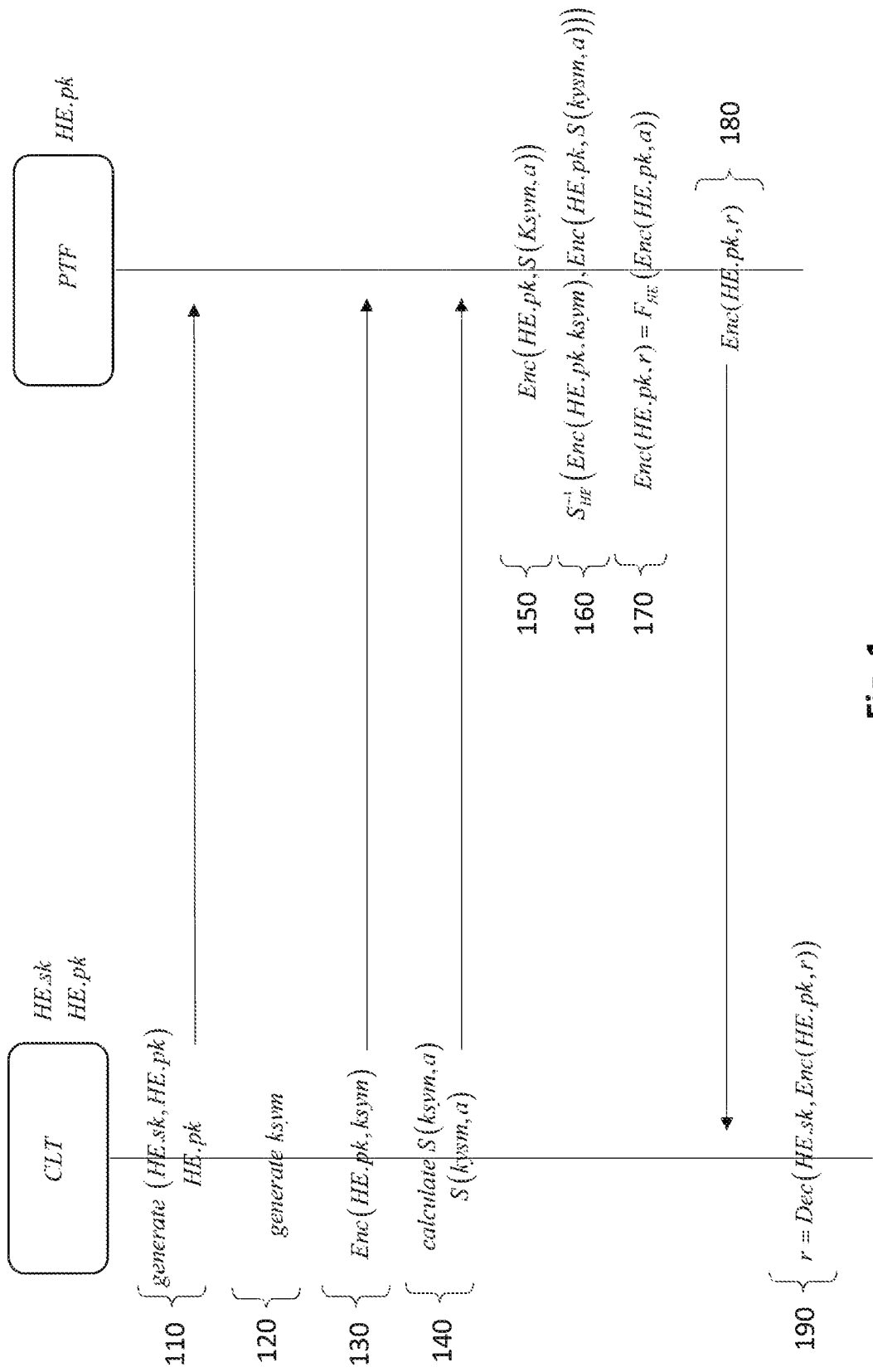
FIG. 1 schematically represents a first method for confidentially executing a data processing request, making use of a known transcryption step of the state of the art.
Figure 2:
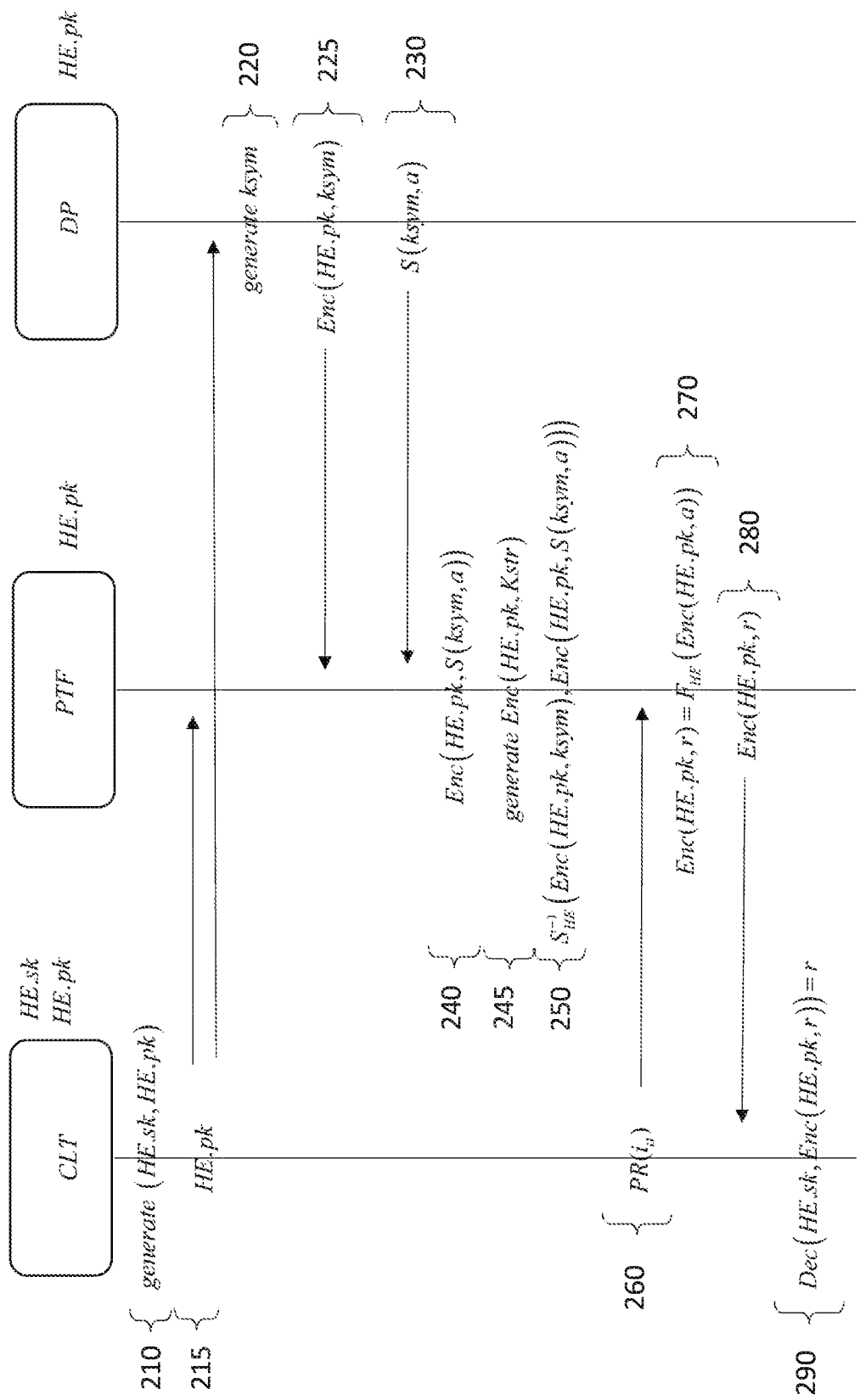
FIG. 2 schematically represents a second method for confidentially executing a data processing request, making use of a known transcryption step of the state of the art.

In the following, an applicative context such as that represented in FIG. 2 is considered. More generally, the remote platform may be queried by a plurality of clients, each client having its own homomorphic (asymmetric) cryptosystem and transmitting the public key of said cryptosystem to the platform as well as to the data provider. Similarly, the remote platform will be able to receive and store data from a plurality of data providers, each provider having its own symmetric key and transmitting it to the platform, after encrypting it by means of the public key of a homomorphic cryptosystem of a client having access rights. For example, data providers could be patients transmitting their genomic data in encrypted form to a platform and clients could be physicians wishing to look up these genomic data. It will be assumed in the following that clients and data providers can identify and authenticate themselves to the platform and that clients have access rights to the data they wish to process. In some cases, clients may be the same as access providers or only as a subset of them. For example, in the aforesaid example, in addition to physicians, patients themselves will be able to access their own genomic data and have these data processed in a confidential manner. Finally, the access rights of different clients may differ, for example, they may be limited to some databases hosted by the platform, to some data fields or to some types of processing only. However, the management of access rights does not fall within the scope of the present invention.

The transcryption method according to the present invention involves several agents: a processing request management module, RQM, a transcryption module, TCA, an access prediction module, AP, and a homomorphic calculation module, KSHC. These modules are, as a general rule, software agents forming part of the remote platform, but some of them, in particular the calculation module, may be made as dedicated processors or processors equipped with hardware accelerators. Some elements of the platform may be distributed in the Cloud or hosted by remote servers.

Without loss of generality, in the following, the case of a client wishing to have the platform perform confidential processing on data previously provided by an access provider will be considered. Data of the access provider are stored in a database of the platform, in a form encrypted by the symmetric key of the access provider.

Processing requests may relate to different fields of a record or different records present in a database hosted by the platform. For example, in the first case, a physician may wish to access to a given gene in a cohort of patients, and in the second case, to different genes in a patient's genome.

Each request received by the management module RQM specifies, for example by means of an index, on which data processing has to be performed. At the end of the processing, the management module returns the processing result, in a form encrypted by the public key of the client's homomorphic cryptosystem.

Figure 3:
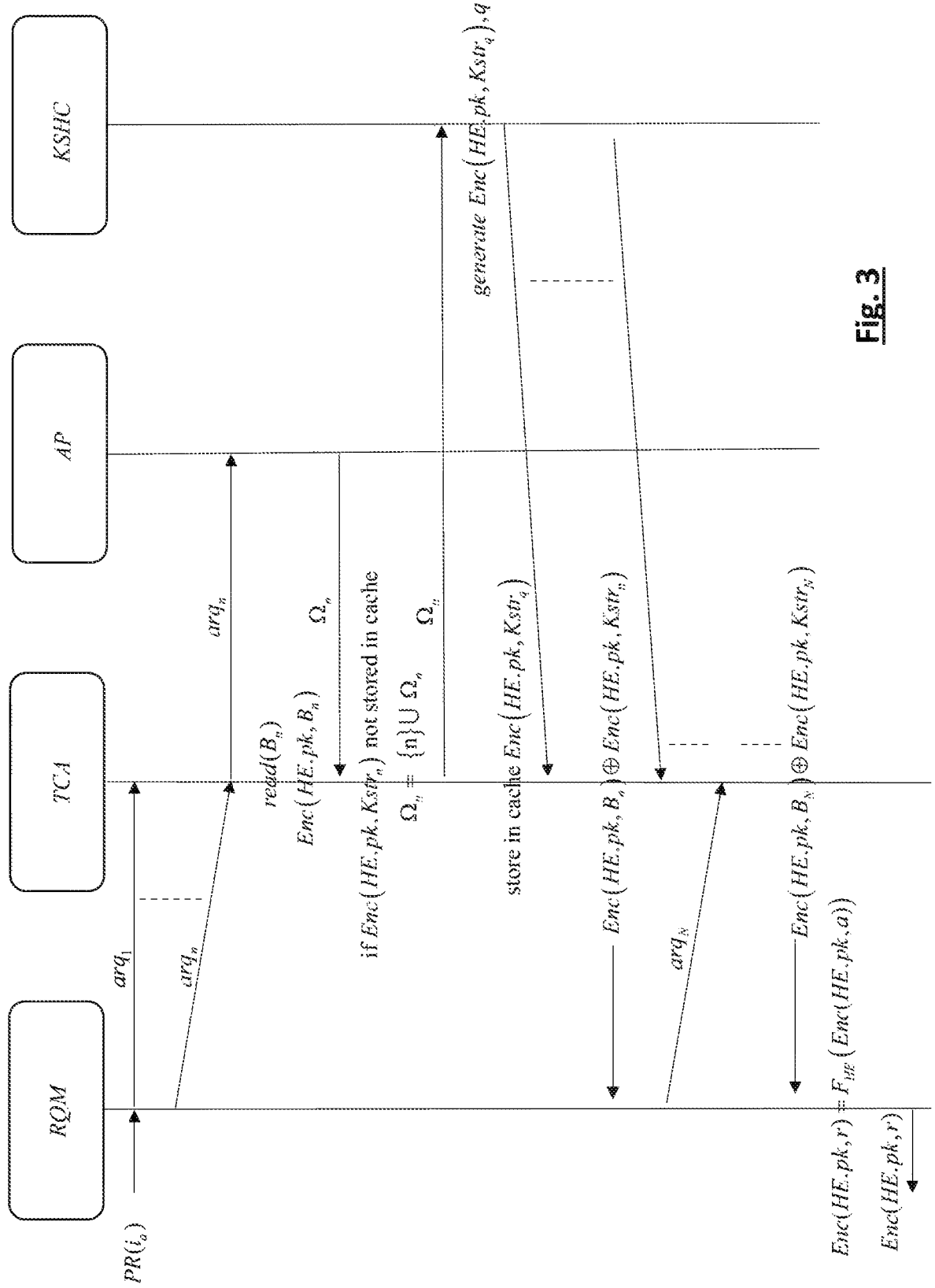
FIG. 3 schematically represents a method for confidentially executing a data processing request making use of a transcryption step according to one embodiment of the invention.

FIG. 3 schematically represents the timing chart of a method for confidentially processing data using a transcryption method according to the invention.

The request management module RQM, the transcryption module TCA, the access prediction module AP, and the homomorphic encryption module KSHC, are represented in the figure.

When the RQM module receives a data processing request, it generates a sequence of requests for access to the data to be processed. Each access request is relating to a data block. These access requests, referred to as $arq_1, \ldots, arq_N$, are transmitted to the transcryption module, TCA, as and when required for processing.

When the transcryption module receives an access request, $arq_n$, it forwards it to the access prediction module, AP. Further, it reads, from the database, the data block, $B_n$, requested in the access request $arq_n$, and homomorphically encrypts it by means of the public key HE.pk. It is reminded that the data block $B_n$ is stored in encrypted form by the symmetric key ksym (that is, by bit-by-bit addition of the key stream Kstr), $B_n = a_n + Kstr_n$ where $a_n$ represents the data in plaintext and $Kstr_n$ the key stream block used for encrypting $a_n$.

The transcryption module also has access to a cache containing homomorphic ciphertexts of the key stream blocks, $Enc(HE.pk, Kstr_p)$ where p is a block index in the key stream.

If the block $Enc(HE.pk, Kstr_n)$ is present in the cache, the transcryption module performs the transcryption operation:

$$Enc(HE.pk, Kstr_n) \oplus Enc(HE.pk, B_n) = Enc(HE.pk, a_n) \quad (5)$$

and returns the result to the request management module.

If the block $Enc(HE.pk, Kstr_n)$ is not present in the cache, it waits for this block.

The access prediction module AP predicts, from the request, $arq_n$, all the data blocks $B_q$, $q \in \Omega_n$ the access to which can be requested during the next access requests. This prediction can be made from predetermined rules (known a priori) depending on the application or be the result of supervised or unsupervised learning. In all cases, the prediction module AP returns the ordered list $\Omega_n$ of indices of these data blocks to the transcryption module.

If the cache does not contain the block $Enc(HE.pk, Kstr_n)$, the index n is added to the ordered list $\Omega_n$ and placed at the top of the list.

The transcryption module transmits the ordered list $\Omega_n$ to the homomorphic encryption module KSHC. This module successively generates in the homomorphic domain, the homomorphic ciphertexts of the key stream blocks, $Enc(HE.pk, Kstr_q)$, $q \in \Omega_n$ and returns them to the transcryption module as they are calculated. This generation is carried out by calculation in the homomorphic domain from the transcryption token, $Enc(HE.pk, ksym)$.

As soon as the transcryption module receives the block, $Enc((HE.pk, Kstr_n)$, it performs the transcryption operation expressed in (5) and returns the result to the request management module.

Subsequent blocks are stored in the cache as they are received.

The process continues with a new access request, $arq_{n+1}$ transmitted by the request management module to the transcryption module. The latter forwards the access request to the access prediction module, which can again predict all the data blocks $B_q$, $q \in \Omega_{n+1}$ the access to which may be requested in subsequent access requests. However, this prediction is optional insofar as the elements of the set $\Omega_{n+1}$ may already be present in the set $\Omega_n$. If the prediction module makes a new prediction, only the elements of $\Omega_{n+1}$ that do not belong to $\Omega_n$ are transmitted to the module KSHC. The latter generates, in the homomorphic domain, homomorphic ciphertexts of key stream blocks corresponding to the indices of $\Omega_{n+1} - \Omega_n$ and transmits them to the transcryption module as they are calculated.

The transcryption module stores the new homomorphic ciphertexts of the key stream blocks in the cache as they are received.

The cache is managed by means of a cache line replacement algorithm or CRP (Cache Replacement Policy) which can be independent of block usage, for example a FIFO (First In First Out) type replacement algorithm, or dependent on block usage, for example an LRU (Last Recently Used) or MRU (Most Recently Used) type algorithm.

Those skilled in the art will understand that the prediction module allows anticipation of accesses and calculation of the homomorphic ciphertexts of key streams blocks, which dramatically reduces the latency of the transcryption operation.

When the request management module has all the transcrypted blocks available $Enc(HE.pk, a_n)$, $n = 1, \ldots, N$, it performs processing in the homomorphic domain and returns the result $Enc(HE.pk, r)$ to the client with $r = F(a)$.

The client can then decrypt the result with the private key of the homomorphic cryptosystem to obtain the result in plaintext, r.

The different modules RQM, TCA, AP, and KSHC can be installed on a same machine or on distinct machines.

According to a first embodiment, the different modules are installed on a same machine. The a priori knowledge on the requests are then those which are addressed to this machine. The homomorphic ciphertexts of the key stream blocks can be calculated in pipeline mode in a time interval between two requests.

According to a second embodiment, the modules RQM, TCA, AP are installed on a first machine and the module KSHC is installed on a second machine, for example a server asynchronously receiving requests for homomorphic ciphertexts of key stream blocks.

This second machine is then specialised in generating the homomorphic ciphertexts of the key stream blocks $Enc(HE.pk, Kstr_q)$, that is in calculating, in the homomorphic domain, this key stream from the transcryption token $Enc(HE.pk, ksym)$. The second machine can be equipped with hardware accelerators so that the homomorphic calculation is as fast as possible. The first machine can transmit, to the second machine, requests for calculating homomorphic ciphertexts of key stream blocks for a transcryption operation to be performed, or even speculatively anticipate future requests.

According to a third embodiment, the module KSHC is made by implementing an infrastructure dispensed in the Cloud or distributed over a plurality of servers, optimised for calculation in the homomorphic domain. Here again, this infrastructure can comprise hardware accelerators so as to reduce calculating time.

Whatever the embodiment contemplated, the platform can host several databases, with each database being fed by a data provider. In other words, each database is associated with a symmetric key. The modules RQM, TCA, AP, and KSHC can be common to all these databases but, in this case, the AP module will use distinct prediction rules according to the different databases. In the same way, the module KSHC will generate homomorphic ciphertexts of different key streams for the different symmetric keys. Alternatively, as many modules AP and modules KSHC as there are databases can be provided, each module AP being then specialised in predicting accesses in the database with which it is associated and each module KSHC being specialised in calculating, in the homomorphic domain, key stream blocks for the symmetric key associated therewith.

The invention claimed is:

1. A method for confidentially processing data stored on a platform, the data being stored in a database, in a form encrypted by stream encryption, using a key stream generated from a symmetric key, the confidential processing being performed upon request from a client having previously generated a private key-public key pair of a homomorphic cryptosystem and having transmitted said public key to the platform, the method comprising:

a request management module, receiving a request from the client, generating a plurality of requests for access to data blocks, and transmitting the requests to a transcryption module;

the transcryption module, receiving a particular request for access, of the plurality of requests for access, to a particular data block of the data blocks, transmitting the particular access request to an access request prediction module, which returns thereto a list of data blocks the access to which is predicted;

the transcryption module reading the particular data block from the database and determining whether a corresponding key stream block is present in a cache, and if not, adding the corresponding key stream block to the list of data blocks, the list of data blocks being provided to a homomorphic calculation module;

the homomorphic calculation module successively calculating, in the homomorphic domain, homomorphic ciphertexts of key stream blocks corresponding to the data blocks on the provided list in an order in which the data blocks appear on the list, and transmitting the calculated homomorphic ciphertexts of the key stream blocks to the transcryption module in real time as the homomorphic ciphertexts are calculated;

the transcryption module storing the homomorphic ciphertexts of the key stream blocks in the cache in real time as the homomorphic ciphertexts are received, and transcrypting the data blocks, the access to which is requested, in real-time as the corresponding homomorphic ciphertexts are received, by adding the data blocks, respectively, with the homomorphic ciphertexts of the corresponding key stream blocks, read from the cache;

the transcryption module transmitting the data blocks thus transcrypted to the request management module, which performs, in the homomorphic domain, the confidential processing on the data blocks thus transcrypted corresponding to the request; and the request management module transmitting, to the client, a result of the confidential processing, in homomorphically encrypted form.

2. The method for confidentially processing data according to claim 1, wherein the request management, transcryption, access request prediction, and homomorphic calculation modules are software agents.

3. The method for confidentially processing data according to claim 1, wherein the request management, transcryption, access request prediction, and homomorphic calculation modules are installed on a same machine.

4. The method for confidentially processing data according to claim 1, wherein the request management, transcryption, and access request prediction modules are located on a first machine, and the homomorphic calculation module is installed on a second machine.

5. The method for confidentially processing data according to claim 4, wherein the second machine is equipped with a homomorphic encryption hardware accelerator.

6. The method for confidentially processing data according to claim 4, wherein the second machine is a server, the first machine asynchronously transmitting, to the server, requests for homomorphic ciphertexts of key stream blocks for transcryption operations to be performed or for predicted transcryption operations.

7. The method for confidentially processing data according to claim 1, wherein the platform hosts a plurality of databases, each database being fed by a data provider and being associated with a symmetric encryption key, the data blocks stored in a certain database, of the plurality of databases, being encrypted by the data provider feeding the certain database, by means of a key stream generated from the symmetric key associated with the certain database.

8. The method for confidentially processing data according to claim 1, wherein the cache is managed by a (First In First Out) FIFO type replacement algorithm.

9. The method for confidentially processing data according to claim 1, wherein the cache is managed by an (Last Recently Used) LRU or (Most Recently Used) MRU type replacement algorithm.

10. The method for confidentially processing data according to claim 1, wherein the platform comprises a plurality of access prediction modules, each access prediction module predicting the requests for access to a corresponding database associated with the access prediction module.

* * * * *